United States Patent
Houser et al.

(10) Patent No.: US 12,110,930 B2
(45) Date of Patent: Oct. 8, 2024

(54) METHODS AND SYSTEMS FOR A MULTISPEED TRANSMISSION

(71) Applicant: Dana Heavy Vehicle Systems Group, LLC, Maumee, OH (US)

(72) Inventors: Jordan M. Houser, Sylvania, OH (US); James Allen, Atherstone (GB)

(73) Assignee: DANA HEAVY VEHICLE SYSTEMS GROUP, LLC, Maumee, OH (US)

( * ) Notice: Subject to any disclaimer, the term of this patent is extended or adjusted under 35 U.S.C. 154(b) by 17 days.

(21) Appl. No.: 17/813,272

(22) Filed: Jul. 18, 2022

(65) Prior Publication Data

US 2024/0019005 A1    Jan. 18, 2024

(51) Int. Cl.
| | | |
|---|---|---|
| F16D 48/06 | (2006.01) | |
| F16H 59/36 | (2006.01) | |
| F16H 61/04 | (2006.01) | |

(52) U.S. Cl.
CPC ....... *F16D 48/06* (2013.01); *B60W 2710/022* (2013.01); *F16D 2500/10412* (2013.01); *F16D 2500/10462* (2013.01); *F16D 2500/30401* (2013.01); *F16D 2500/30806* (2013.01); *F16D 2500/50607* (2013.01); *F16D 2500/70235* (2013.01); *F16D 2500/7041* (2013.01); *F16H 2061/047* (2013.01); *F16H 2061/0474* (2013.01)

(58) Field of Classification Search
CPC ...... F16H 2061/0474; F16H 2061/074; B60W 2710/022; F16D 48/06; F16D 2500/10412; F16D 2500/30401; F16D 2500/30806; F16D 2500/50607; F16D 2500/70235; F16D 2500/7041; F16D 11/00–16

See application file for complete search history.

(56) References Cited

U.S. PATENT DOCUMENTS

| | | | |
|---|---|---|---|
| 7,785,221 B2 * | 8/2010 | Steinwender | B60K 6/48 475/5 |
| 8,932,180 B2 * | 1/2015 | Hirawaki | F16D 11/14 477/12 |
| 9,175,765 B2 | 11/2015 | Ikeya et al. | |
| 9,360,109 B2 * | 6/2016 | Weingartz | F16H 63/3023 |
| 2014/0007727 A1 * | 1/2014 | Weingartz | F16H 61/30 74/473.11 |
| 2016/0146341 A1 * | 5/2016 | Hoefflin | F16H 61/30 74/336 R |
| 2018/0112727 A1 | 4/2018 | Ono et al. | |
| 2020/0047759 A1 | 2/2020 | Kawale et al. | |
| 2021/0239164 A1 | 8/2021 | Hellsing et al. | |

OTHER PUBLICATIONS

Houser, J., "Methods and Systems for an Asymmetric Clutch Collar," U.S. Appl. No. 17/655,939, filed Mar. 22, 2022, 38 pages.

* cited by examiner

*Primary Examiner* — Tinh Dang
(74) *Attorney, Agent, or Firm* — McCoy Russell LLP

(57) ABSTRACT

Various methods and systems are provided for a multispeed transmission. In one example, a method to increasing a shift performance of a transmission with actuated clutches comprises controlling an engagement depth of a clutch based on a gear that is being selected by the clutch. A target engagement depth of the clutch may be retrieved from a gear selection matrix in a lookup table stored in the memory of a controller of the transmission. The target engagement depth may depend on an amount of torque expected to be transferred to the gear.

18 Claims, 5 Drawing Sheets

METHODS AND SYSTEMS FOR A MULTISPEED TRANSMISSION

TECHNICAL FIELD

Embodiments of the subject matter disclosed herein relate generally to dog clutch transmission systems.

BACKGROUND

A multistage transmission of a vehicle may include one or more dog clutches used for shifting between gears of the transmission. A dog clutch may include a clutch collar with a set of teeth that axially protrude from a face of the clutch collar. During shifting from a first gear of the transmission to a second gear of the transmission, the dog clutch may be controlled to slide along a shaft of the transmission, first disengaging with the first gear, and subsequently engaging with the second gear. The dog clutch engages with the second gear when the set of teeth of the clutch collar mesh with a set of similarly-sized teeth of the second gear.

For conventional multistage transmissions that use actuated clutches, control software may have a static target engagement depth per clutch, where a depth of engagement of the clutch is the same regardless of a desired gear selection. However, a shift performance of the multistage transmission may depend on a time taken to disengage from a first gear of the transmission and engage a second gear of the transmission, where a faster shifting of gears increases the shift performance. The time taken may depend on a depth of engagement of the dog clutch, where a deeper engagement may take more time. Some clutches may have different torque requirements, where a maximum torque that a coupling transmits may be dependent on a gear being selected by a clutch. As a result, targeting the same engagement depth regardless of a selected gear may result in sub-optimal shift performance.

SUMMARY

In one example, the issues described above may be addressed by a method to decrease a shifting time for a transmission with actuated clutches, the method comprising controlling an engagement depth of a clutch based on a gear that is being selected by the clutch. To control the engagement depth of the clutch when shifting into the selected gear, a gear engagement depth of the clutch may be set prior to engaging the selected gear, where the gear engagement depth is based on a gear selection target depth for the selected gear retrieved from a lookup table stored in a memory of a controller of the transmission. After the engagement depth is set for the selected gear, the clutch may be commanded to disengage from a current gear, and engage the selected gear at the retrieved engagement depth. By engaging the selected gear at the retrieved engagement depth rather than a static engagement depth for all gears of the transmission, gears that transfer less torque to wheels of the vehicle may be engaged at a lesser depth than gears that transfer more torque to the wheels. At the lesser depth, a movement of the clutch to engage the selected gear may be reduced, which may increase a speed with which the selected gear is engaged, thereby increasing a shift performance of the vehicle. In this way, an efficiency of shifting between gears of the vehicle may be increased by engaging each gear of the transmission at a depth that is sufficient to transfer a maximum amount of torque associated with the gear, and no torque in excess of the maximum amount.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present disclosure will be better understood from reading the following description of non-limiting embodiments, with reference to the attached drawings, wherein below.

DETAILED DESCRIPTION

The following disclosure relates to methods and systems for a clutch of a vehicle transmission. A vehicle, such as the vehicle shown by FIG. 1A, includes a transmission with a dog clutch. A first face of the dog clutch may engage a first gear of the transmission, and a second, opposing face of the dog clutch may engage a second gear of the transmission, as depicted in a simplified gearbox shown in FIG. 1B. The dog clutch may engage the first gear at a first engagement depth, and the dog clutch may engage the second gear at a second engagement depth, where the first and second engagement depths are determined based on an amount of torque transferred through the first and second gears, respectively. Three examples of different gear engagement depths are shown in FIGS. 2A, 2B, and 2C. The dog clutch may engage one or more gears of the transmission via a method illustrated in the flowchart of FIG. 3, with a timing described in relation to the timing diagram of FIG. 4.

Figure 1A:
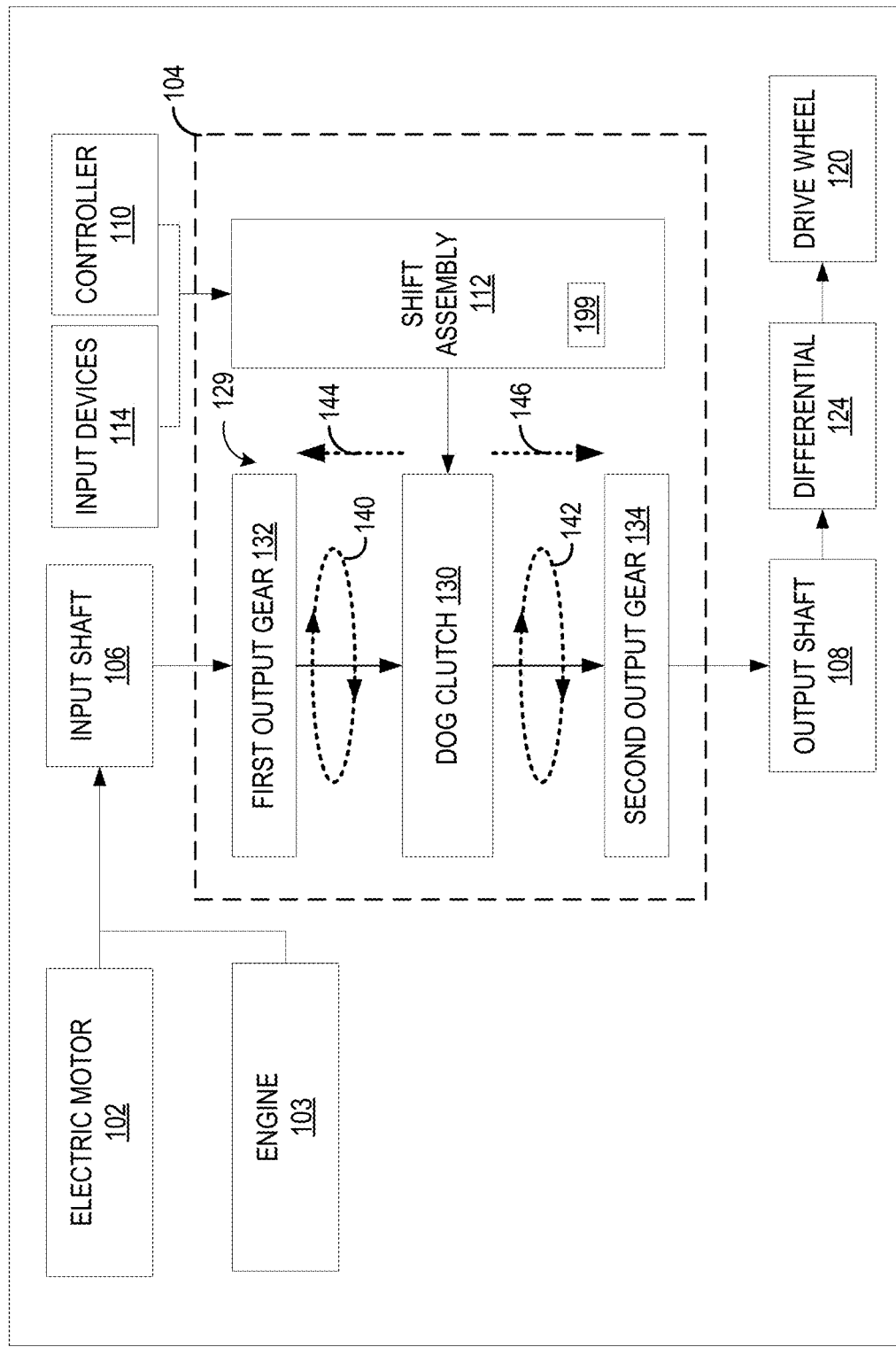
FIG. 1A schematically shows a vehicle including a transmission with dog clutch, in accordance with one or more embodiments of the present disclosure.
Figure 2A:
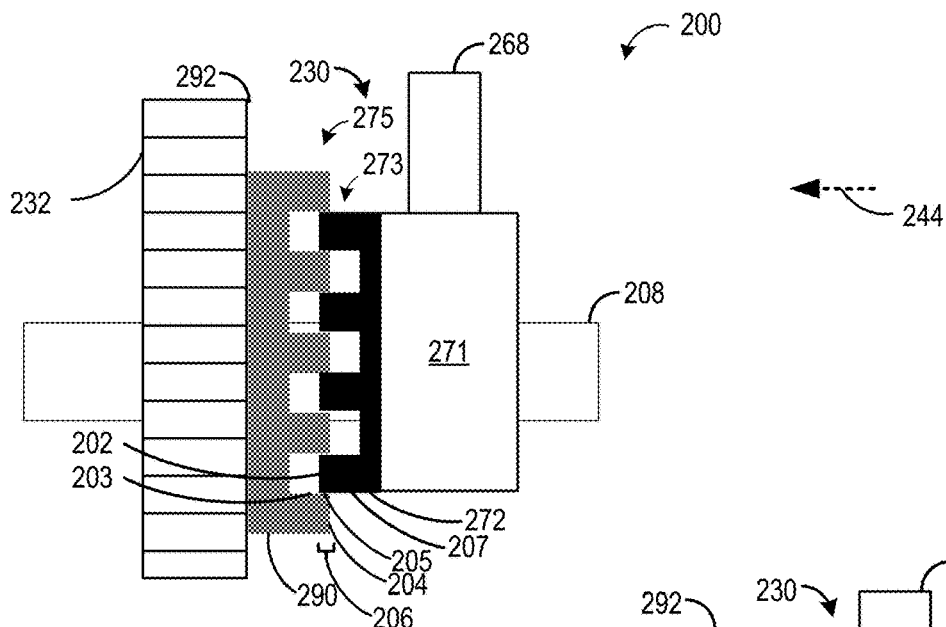
FIG. 2A shows a gear engagement of a dog clutch at a first depth, in accordance with one or more embodiments of the present disclosure.
Figure 2B:
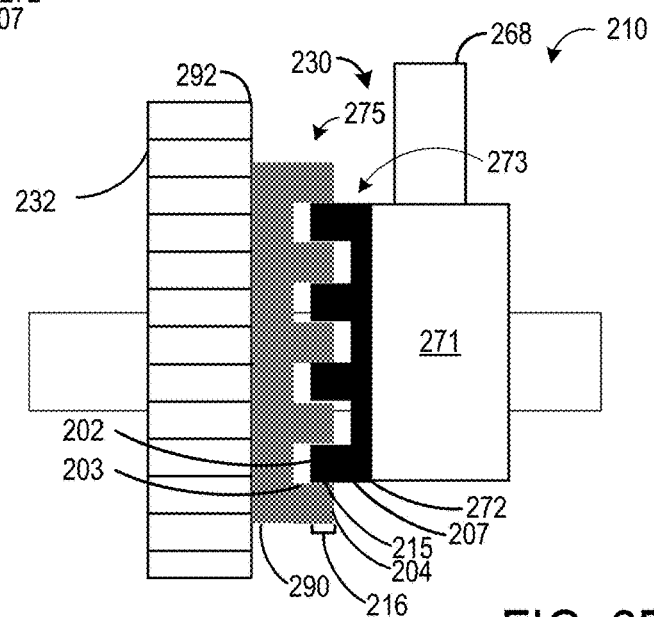
FIG. 2B shows a gear engagement of a dog clutch at a second depth, in accordance with one or more embodiments of the present disclosure.
Figure 2C:
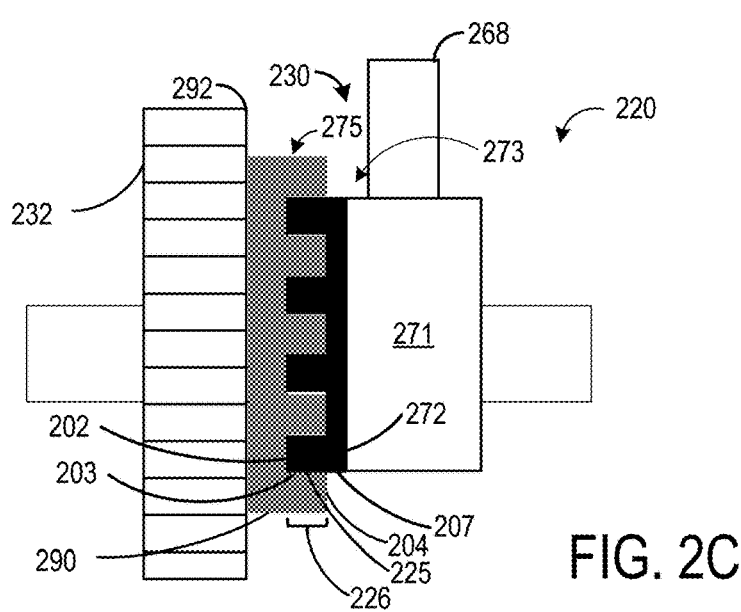
FIG. 2C shows a gear engagement of a dog clutch at a third depth, in accordance with one or more embodiments of the present disclosure.

Referring now to FIG. 1A, an example vehicle 100 is shown. In some examples, vehicle 100 may be a hybrid vehicle configured to provide torque to one or more wheels from multiple sources, such as engine 103 and electric motor 102. In other examples, vehicle 100 is configured to provide torque to the one or more wheels via only one of engine 103 or electric motor 102. In the example in which vehicle 100 is a hybrid vehicle, operation of the vehicle 100 may be adjusted between various different modes in which torque is supplied to the one or more wheels via only the engine 103, via only the electric motor 102, or via a combination of the engine 103 and electric motor 102. Electric motor 102 may be a motor/generator configured to provide torque output to the one or more wheels and to generate electrical energy during operation of the vehicle 100 (e.g., via regenerative braking, as one example). Vehicle 100 is provided as an example of a system including a shift assembly as described herein. However, vehicle 100 is not intended to be limiting and in some examples the shift assembly may be included in vehicles having a different configuration (e.g., a different number and/or relative configuration of wheels and/or other components).

Vehicle 100 may be powered by electric motor 102 and/or engine 103, which generates torque at a drive wheel 120 when one or more clutches are engaged via a transmission 104 coupled to a transmission input shaft 106 and an output shaft 108. In some embodiments, the output shaft 108 is a countershaft rotatably coupled to an input of a differential gear assembly 124, which may power one or more of drive wheel 120. In other embodiments, the output shaft 108 may be coaxially aligned with the transmission input shaft 106, and a countershaft may be used to transfer torque applied to the input shaft 106 to the output shaft 108 via a gear assembly of the transmission. In still other embodiments, engine 103 and/or electric motor 102, transmission 104, input shaft 106, and output shaft 108 may be aligned perpendicular to axles of vehicle 100, whereby the transfer of torque from output shaft 108 to drive wheel 120 is accomplished via the differential gear assembly 124.

Transmission 104 may be an automatic transmission, whereby shifting is handled automatically by an electronic controller 110, and gear selection is automatically determined by the controller based on vehicle operating conditions (e.g., engine speed, vehicle speed, wheel torque, etc.). For automatic shifting, electronic controller 110 may be communicatively coupled to a shift assembly 112 that engages gears of transmission 104, where electronic controller 110 may command shift assembly 112 to engage and/or disengage gears of the transmission. Shift assembly 112 may include actuator sensors from which electronic controller 110 may receive data used to control operation of shift assembly 112 (e.g., to adjust a selected gear of transmission 104). For example, shift assembly 112 may include a clutch engagement sensor 199, where clutch engagement sensor may output a distance between a clutch of transmission 104 and a gear of transmission 104. As described in greater detail below, the output of the clutch engagement sensor may be used to control a speed of gear engagement via the clutch. Electronic controller 110 may also receive input from other sensors of vehicle 100, such as wheel sensors, pedal position sensors, temperature sensors, pressure sensors, speed sensors, throttle sensors, battery charge sensors, air-fuel ratio sensors, and the like. Electronic controller 110 may send control signals to various actuators communicatively coupled to electric motor 102, engine 103, and/or other components of vehicle 100. The various actuators may include motors of shift assembly 112 that engage the gears of transmission 104 by sliding synchronizer rings and clutches along transmission input shaft 106 and/or transmission output shaft 108. For example, the synchronizer rings and clutches may be moved along the transmission input shaft 106 and/or transmission output shaft 108 by shift forks coupled to a shift lever. The various actuators may also include, for example, various valves, throttles, fuel injectors, etc. The types of sensors and actuators listed herein are for illustrative purposes and any type of sensors and/or actuators may be included without departing from the scope of this disclosure.

Electronic controller 110 may be a microcomputer, which may include a microprocessor unit, input/output ports, and an electronic storage medium for executable programs and calibration values. Electronic controller 110 may include non-transitory computer readable medium (memory) in which programming instructions are stored, and may be programmed with computer readable data representing instructions executable to perform the methods described below, as well as other variants that are anticipated but not specifically listed. Memory as referenced herein may include volatile and non-volatile or removable and non-removable media for a storage of electronic-formatted information such as computer readable instructions or modules of computer readable instructions, data, etc. Examples of computer memory may include, but are not limited to RAM, ROM, EEPROM, flash memory, or any other medium which can be used to store the desired electronic format of information and which can be accessed by the processor or processors or at least a portion of a computing device. Electronic controller 110 may be electrically coupled to other components of vehicle 100, such as, for example, a battery and a starter, which may be used to provide initial power to the controller and/or start the engine. Vehicle 100 may be controlled at least partially by the controller 110 and by input from a vehicle operator via the one or more input devices 114 (e.g., a shift lever, an accelerator pedal with a pedal position sensor for generating a proportional pedal position signal).

As gears of transmission 104 are shifted, a torque applied to transmission input shaft 106 is transferred to transmission output shaft 108, which is rotatably coupled to differential gear assembly 124, which in turn rotates drive wheel 120. Transmission 104 may include various gears rotatably coupled to transmission input shaft 106 and/or transmission output shaft 108. For example, transmission 104 may include a first gear, a second gear, a third gear, and a reverse gear. In some embodiments, a fourth, fifth, and/or additional gears may also be included in transmission 104. In FIG. 1A, a simplified gear assembly 129 is depicted including a first output gear 132, a second output gear 134, and a dog clutch 130 arranged coaxially around transmission output shaft 108, where dog clutch 130 is positioned between first output gear 132 and second output gear 134. In the simplified gear assembly, first output gear 132 and second output gear 134 may represent two consecutive gears of the various gears. For example, first output gear 132 may represent the first gear of the transmission, and second output gear 134 may represent the second gear of the transmission, or first output gear 132 may represent the second gear of the transmission, and second output gear 134 may represent the third gear of the transmission, and so on.

Dog clutch 130 may be actuated (e.g., by controller 110 and/or input devices 114) to slide in a first direction 144 to engage with first output gear 132, or slide in a second direction 142 to engage with second output gear 134. Dog clutch 130 may disengage with first output gear 132 and engage with second output gear 134 to shift up when accelerating vehicle 100, and dog clutch 130 may disengage with second output gear 134 and engage with first output gear 132 to shift down when slowing vehicle 100 down.

During operation of vehicle 100 powered by electric motor 102, a first torque may be generated on transmission input shaft 106 by electric motor 102. As transmission input shaft 106 rotates, the first torque may be transferred from transmission input shaft 106 to first output gear 132 and second output gear 134, in accordance with respective gear ratios of input gears of transmission input shaft 106 coupled to first output gear 132 and second output gear 134. As a result of having different gear ratios, first output gear 132 may rotate in direction 140 at a first rotational speed, and second output gear 134 may rotate in direction 140 at a second, different rotational speed.

Dog clutch 130 may be coupled to transmission output shaft 108, where a rotational speed of dog clutch 130 may be the same as a rotational speed of transmission output shaft 108. When the rotational speed of transmission output shaft 108 and dog clutch 130 are equal to the first rotational speed of first output gear 132, dog clutch 130 may engage with first output gear 132. When the rotational speed of transmission output shaft 108 and dog clutch 130 are equal to the second rotational speed of second output gear 134, dog clutch 130 may engage with second output gear 134.

For example, when vehicle 100 starts operation, the rotational speed of transmission output shaft 108 and dog clutch 130 may both be zero (e.g., vehicle 100 is not in motion), and the rotational speed of transmission input shaft 106 may be zero (e.g., electric motor 102 may be switched off, or transmission input shaft 106 may be disengaged from electric motor 102 via a clutch on transmission input shaft 106). As a result of the rotational speed of dog clutch 130 and the rotational speed of transmission input shaft 106 being zero, dog clutch 130 may engage with first output gear 132. In response to a command from input devices 114 and/or electronic controller 110, shift assembly 112 may slide dog clutch 130 in direction 144 to engage first output gear 132. As dog clutch 130 engages first output gear 132, teeth of a first face of dog clutch 130 may mesh with teeth of first output gear 132, mechanically coupling dog clutch 130 to first output gear 132. When dog clutch 130 is coupled to first output gear 132, the first torque may be transferred from transmission input shaft 106 to dog clutch 130 via first output gear 132, generating a second torque on transmission output shaft 108, where the second torque is based on a gear ratio of first output gear 132.

As vehicle 100 accelerates, vehicle 100 may achieve a threshold speed, where the dog clutch 130 may engage with second output gear 134. In response to a command from input devices 114 and/or electronic controller 110, shift assembly 112 may slide dog clutch 130 in direction 146 to engage second output gear 134. As dog clutch 130 engages second output gear 134, teeth of a second, opposing face of dog clutch 130 (e.g., on an opposite side of dog clutch 130) may mesh with similarly-sized teeth of second output gear 134, mechanically coupling dog clutch 130 to second output gear 134. When dog clutch 130 is coupled to second output gear 134, the first torque may be transferred from transmission input shaft 106 to dog clutch 130 via second output gear 134, generating a third torque on transmission output shaft 108, where the third torque is based on a gear ratio of second output gear 134. An engagement of first output gear 132 and second output gear 134 by dog clutch 130 in described in greater detail below in reference to FIG. 1B.

Figure 1B:
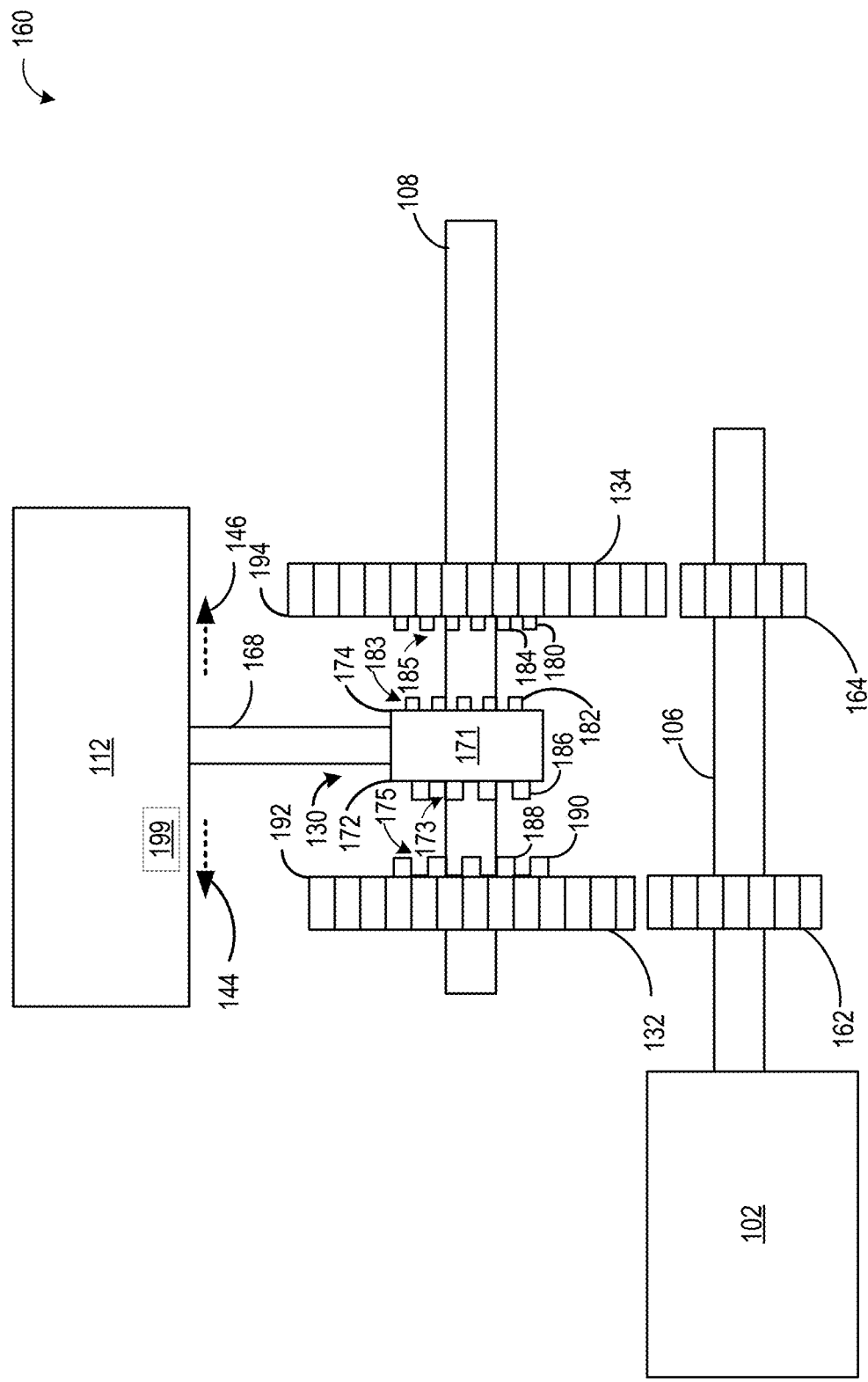
FIG. 1B schematically shows a simplified gearbox of a transmission including a dog clutch and two gears, in accordance with one or more embodiments of the present disclosure.

Referring now to FIG. 1B, a simplified gearbox 160 depicts simplified gear assembly 129 of FIG. 1A in greater detail. In FIG. 1B, a first input gear 162 and a second input gear 164 may be mechanically coupled to transmission input shaft 106, where first and second input gears 162 and 164 rotate at a same rotational speed as transmission input shaft 106. First input gear 162 may be mechanically coupled to first output gear 132 described above in reference to FIG. 1A. Second input gear 164 may be mechanically coupled to second output gear 134 described above in reference to FIG. 1A. As electric motor 102 applies the first torque to transmission input shaft 106, a rotation of first input gear 162 causes first output gear 132 to rotate at the first rotational speed described above, in an opposite direction of the rotation of first input gear 162, and a rotation of second input gear 164 causes second output gear 134 to rotate at the second rotational speed described above, in an opposite direction of the rotation of the second input gear 164.

The first rotational speed may depend on a gear ratio between first input gear 162 and first output gear 132, and the second rotational speed may depend on a gear ratio between second input gear 164 and second output gear 134. As an example, in one embodiment, first input gear 162 may be rotatably coupled to first output gear 132 at a gear ratio of 3.666, and second input gear 164 may be rotatably coupled to second output gear 134 at a gear ratio of 2.047 (e.g., where first output gear 132 and second output gear 134 correspond to first and second gears of vehicle 100, respectively). Thus, when the vehicle is in first gear, first input gear 162 engages with first output gear 132 such that transmission input shaft 106 completes 3.666 rotations in order for transmission output shaft 108 to complete a single rotation. When the vehicle is in second gear, second input gear 164 engages with second output gear 134 such that transmission input shaft 106 completes 2.047 rotations in order for transmission output shaft 108 to complete a single rotation.

In another embodiment, first input gear 162 may be rotatably coupled to first output gear 132 at the gear ratio of 2.047, and second input gear 164 may be rotatably coupled to second output gear 134 at a gear ratio of 1.258 (e.g., where first output gear 132 and second output gear 134 correspond to second and third gears of vehicle 100, respectively). When the vehicle is in third gear, second input gear 164 engages with second output gear 134 such that transmission input shaft 106 completes 1.258 rotations in order for transmission output shaft 108 to complete a single rotation. In other embodiments, different gear ratios may be used. It should be appreciated that the examples provided herein are for illustrative purposes, and various gear ratios may be used without departing from the scope of this disclosure.

In FIG. 1B, first output gear 132 and second output gear 134 are engaged by shift assembly 112 via a shift fork 168. In various embodiments, shift assembly 112 may control a movement and/or a position of shift fork 168 via one or more actuators. The one or more actuators may be of various different types, and may include corresponding actuator motors activated by a controller (e.g., electronic controller 110). The one or more actuators may adjust the position of shift fork 168 to control a position of dog clutch 130 along transmission output shaft 108. In various embodiments, the actuator motors may use reduction gearings and/or reduction gearing assemblies to control the movement of shift fork 168.

A dual-faced clutch collar 171 of dog clutch 130 may rotate at a rotational speed of output shaft 108, as a result of a coupling of dual-faced clutch collar 171 with output shaft 108. In various embodiments, dual-faced clutch collar 171 may be coupled to output shaft 108 via a plurality of splines configured along an inner perimeter of dual-faced clutch collar 171, which may engage with splines of output shaft 108. In accordance with the movement of shift fork 168, dual-faced clutch collar 171 may be moved along output shaft 108 in the first direction 144 to engage first output gear 132 (e.g., horizontally to the left), or dual-faced clutch collar 171 may be moved along output shaft 108 in the second direction 146 to engage second output gear 134 (e.g., horizontally to the right).

For example, in the embodiment depicted in FIG. 1B, to engage first output gear 132, shift assembly 112 may move shift fork 168 in direction 144 (e.g., to the left), whereby dog clutch 130 may slide dual-faced clutch collar 171 from a neutral position (e.g., a position in which no gears are engaged) in direction 144 to engage first output gear 132. To disengage first output gear 132 and engage second output gear 134, shift assembly 112 may move shift fork 168 in direction 146 (e.g., to the right), whereby dog clutch 130 may slide dual-faced clutch collar 171 into the neutral position to the right to disengage first output gear 132. Shift assembly 112 may continue to slide shift fork 168 to the right, whereby dog clutch 130 may slide dual-faced clutch collar 171 to engage second output gear 134.

The engagement and disengagement of gears of transmission 104 by shift assembly 112 may be controlled by a controller of the vehicle, such as electronic controller 110, in response to signals received from various sensors of the vehicle. For example, as vehicle 100 speeds up, the controller may receive indications of vehicle speed from sensors including pedal position sensors, throttle sensors, wheel sensors, and the like. Additionally, the controller may receive from shift assembly 112 an indication that first output gear 132 is engaged. When the speed of the vehicle exceeds a threshold speed, the controller may signal to shift assembly 112 to engage one or more actuator gear assemblies in order to disengage first output gear 132 and engage second output gear 134. As shift fork 168 engages second output gear 134, a position sensor of shift assembly 112 may indicate to the controller that vehicle 100 is in the relevant gear.

Similarly, as vehicle 100 slows down, when the controller receives signals from the sensors that the speed of the vehicle has decreased below a threshold value for engaging first output gear 132, the controller may signal to shift assembly 112 to move shift fork 168 into a position corresponding to neutral. The controller may signal to shift assembly 112 to engage the one or more actuator gear assemblies in order to disengage second output gear 134 and engage first output gear 132. As shift fork 168 engages first output gear 132, a position sensor of shift assembly 112 may indicate to the controller that vehicle 100 is in the relevant gear.

Dual-faced clutch collar 171 may engage first output gear 132 via a first set of teeth 173 protruding axially from a first face 172 of dual-faced clutch collar 171, where the first set of teeth 173 engage first output gear 132 by sliding to mesh with a second set of teeth 175 protruding axially from an opposing face 192 of first output gear 132, where the second set of teeth 175 are similarly sized to the first set of teeth 173. Thus, when dual-faced clutch collar 171 engages first output gear 132, each tooth of the first set of teeth 173 slides in between two opposing teeth of the second set of teeth 175. For example, in FIG. 1B, a tooth 186 of the first set of teeth 173 may slide into a space (e.g., a dog hole) between a first adjacent tooth 188 and a second adjacent tooth 190 of the second set of teeth 175. Accordingly, each tooth of the second set of teeth 175 slides in between two opposing teeth of the first set of teeth 173.

In some embodiments, a first spacing of the second set of teeth 175 may not be the same as a second spacing of the first set of teeth 173, where the teeth of the second set of teeth 175 may not engage all sides of the teeth of the first set of teeth 173. In other words, each tooth of the second set of teeth 175 may slide into a space between two corresponding teeth of the first set of teeth 173, where the space has a width that is greater than a width of the teeth of the second set of teeth 175. Therefore, each tooth of the second set of teeth 175 may engage a similarly-sized tooth of the first set of teeth 173 on one side of the space, and may not engage a similarly-sized tooth of the first set of teeth 173 on an opposing side of the space. For example, a spacing between teeth 188 and 190 may be greater than a width of tooth 186, whereby when the first set of teeth 173 engages with the second set of teeth 175, tooth 186 may engage a side of tooth 188 and may not engage a side of tooth 190, or tooth 186 may engage a side of tooth 190 and may not engage a side of tooth 188.

Similarly, dual-faced clutch collar 171 may engage second output gear 134 via a first set of teeth 183 protruding axially from a second face 174 of dual-faced clutch collar 171, where the first set of teeth 183 engage second output gear 134 by sliding to mesh with a second set of teeth 185 protruding axially from an opposing face 194 of second output gear 134, where the second set of teeth 185 are similarly sized to the first set of teeth 183. Thus, when dual-faced clutch collar 171 engages second output gear 134, each tooth of the first set of teeth 183 may slide between two adjacent teeth of the second set of teeth 185. For example, a tooth 182 of the first set of teeth 183 may slide into a space (e.g., a dog hole) between a first adjacent tooth 180 and a second adjacent tooth 184 of the second set of teeth 185. Similarly, each tooth of the second set of teeth 185 may be moved in between two adjacent teeth of the first set of teeth 183. As described above, in some embodiments, the space between first adjacent tooth 180 and second adjacent tooth 184 may be greater than a width of tooth 182, whereby tooth 182 may engage with a side of first adjacent tooth 180 and may not engage with a side of second adjacent tooth 184, or tooth 182 may engage with a side of second adjacent tooth 184 and may not engage with a side of first adjacent tooth 180.

The first set of teeth 173 of first face 172 of dual-faced clutch collar 171 is similarly sized to the second set of teeth 175 of opposing face 192 of first output gear 132. Similarly, the first set of teeth 183 of second face 174 of dual-faced clutch collar 171 is similarly sized to the second set of teeth 185 of opposing face 194 of second output gear 134. However, in some embodiments, the first set of teeth 173 of first face 172 may not be similarly sized to the first set of teeth 183 of second face 174. For example, tooth 186 of first face 172 of dual-faced clutch collar 171 may have a first profile, and tooth 182 of second face 174 of dual-faced clutch collar 171 may have a second profile, where the first profile is not the same as the second profile (e.g., where dual-faced clutch collar 171 is asymmetric with respect to first face 172 and second face 174). For example, first set of teeth 173 of first face 172 may have a first set of dimensions, and first set of teeth 183 of second face 174 may have a second set of dimensions, where the second set of dimensions are different from the first set of dimensions. Additionally, the first set of dimensions may include a first spacing between the first set of teeth 173, which may be different from a second spacing included in the second set of dimensions of the first set of teeth 183.

When the first set of teeth 173 mesh with the second set of teeth 175, dual-faced clutch collar 171 may be mechanically coupled to first output gear 132. As a result of dual-faced clutch collar 171 being mechanically coupled to first output gear 132, the first torque applied to transition input shaft 106 by electric motor 102 may generate the second torque applied to transition output shaft 108, where the second torque is a function of the first torque and a first gear ratio between first output gear 132 and first input gear 162. Similarly, when the first set of teeth 183 mesh with the second set of teeth 185, dual-faced clutch collar 171 may be mechanically coupled to second output gear 134. As a result of dual-faced clutch collar 171 being mechanically coupled to second output gear 134, the first torque applied to transition input shaft 106 by electric motor 102 may generate the third torque applied to transition output shaft 108, where the third torque is a function of the first torque and a second gear ratio between second output gear 134 and second input gear 164.

The dual-faced clutch collar 171 may engage an output gear (e.g., first output gear 132 or second output gear 134) with a depth of engagement, where the depth of engagement is a distance corresponding to an amount of overlap between teeth of the dual-faced clutch collar 171 and teeth of an opposing face of the output gear (e.g., opposing face 192 or opposing face 194, respectively).

Referring briefly to FIGS. 2A, 2B, and 2C, different exemplary depths of engagement are shown between a clutch collar 271 of a dog clutch 230 and an output gear 232. Clutch collar 271, dog clutch 230, and output gear 292 may be non-limiting examples of dual-faced clutch collar 171, dog clutch 130, and output gear 132 of FIG. 1B. FIGS. 2A, 2B, and 2C are shown approximately to scale.

FIG. 2A shows a first clutch engagement diagram 200, where a clutch collar 271 engages with output gear 232 at a first exemplary depth of engagement 206, in response to a movement of a shift fork 268 in a direction indicated by an arrow 244. As described above in reference to FIG. 1B, when clutch collar 271 engages with output gear 232, a first set of teeth 273 (e.g., first set of teeth 173) meshes with a second set of teeth 275 (e.g., second set of teeth 175). As first set of teeth 273 meshes with second set of teeth 275, an outer surface 202 of the first set of teeth 273 moves past an opposing outer surface 204 of the second set of teeth 275 in a direction indicated by arrow 244 along an output shaft 208 (e.g., output shaft 108). As the outer surface 202 moves past opposing outer surface 204, an overlapping area of face-sharing contact 205 between a first clutch tooth face 207 of output gear 232 and a second output gear tooth face 203 of dog clutch 230 increases. Torque may be transferred from dog clutch 230 to output gear 232 via the area of face-sharing contact 205. In FIGS. 2A, 2B, and 2C, the area of face-sharing contact 205 is indicated with respect to a first tooth 272 of first set of teeth 273 and a second tooth 290 of second set of teeth 275. However, it should be appreciated that areas of face-sharing contact 205 may exist between each tooth of first set of teeth 273 and each tooth of second set of teeth 275. As the area of face-sharing contact 205 increases, an amount of torque that may be transferred from dog clutch 230 to output gear 232 increases. Because the first depth engagement 206 is short, and the area of face-sharing contact 205 is small, a first amount of torque that may be transferred from dog clutch 230 to output gear 232 may be small.

FIG. 2B shows a second clutch engagement diagram 210. In second clutch engagement diagram 210, clutch collar 271 engages with output gear 232 at a second exemplary depth of engagement 216, where the second exemplary depth of engagement 216 is greater than the first exemplary depth of engagement 206. At the second exemplary depth of engagement 216, outer surface 202 of the first set of teeth 273 has moved farther past opposing outer surface 204 of the second set of teeth 275. As a result, an overlapping area of face-sharing contact 215 between first clutch tooth face 207 and second output gear tooth face 203 is greater than the area of face-sharing contact 205 of FIG. 2A. Because the second depth engagement 216 is greater than the first exemplary depth of engagement 206, and the area of face-sharing contact 215 is greater than the area of face-sharing contact 205, a second amount of torque that may be transferred from dog clutch 230 to output gear 232 at the second depth engagement may be greater than the first amount of torque transferred from dog clutch 230 to output gear 232 at the first depth engagement of FIG. 2A.

FIG. 2C shows a third clutch engagement diagram 220. In third clutch engagement diagram 220, clutch collar 271 engages with output gear 232 at a third exemplary depth of engagement 226, where the third exemplary depth of engagement 226 is greater than both the second exemplary depth of engagement 216 and the first exemplary depth of engagement 206. At the third exemplary depth of engagement 226, outer surface 202 of the first set of teeth 273 has moved even farther past opposing outer surface 204 of the second set of teeth 275. As a result, an overlapping area of face-sharing contact 225 between first clutch tooth face 207 and second output gear tooth face 203 is greater than the area of face-sharing contact 215 of FIG. 2B and the area of face-sharing contact 205 of FIG. 2A. In FIG. 2C, the face-sharing contact 225 has been maximized, and the dog clutch 230 is fully engaged with the output gear 232. When the dog clutch 230 is fully engaged with the output gear 232, there is face-sharing contact between surfaces of all teeth of the first set of teeth 273 and all teeth of the second set of teeth 275, and no space between the first set of teeth 273 and the second set of teeth 275.

Because the third depth engagement 226 is greater than the second exemplary depth of engagement 216, and the area of face-sharing contact 225 is greater than the area of face-sharing contact 215, a third amount of torque that may be transferred from dog clutch 230 to output gear 232 at the third depth engagement may be greater than the second amount of torque transferred from dog clutch 230 to output gear 232 at the second depth engagement of FIG. 2B and the first amount of torque transferred from dog clutch 230 to output gear 232 at the first depth engagement of FIG. 2A.

Returning to FIG. 1B, when the dual-faced clutch collar 171 engages first output gear 132, the first set of teeth 173 may mesh with the second set of teeth 175 at a first target engagement depth. The first target engagement depth may be deep, where the first set of teeth 173 overlap with the second set of teeth 175 of opposing face 192 by a first distance. When the dual-faced clutch collar 171 engages second output gear 134, the first set of teeth 183 may mesh with the second set of teeth 185 at a second target engagement depth. The second target engagement depth may be shorter than the first target engagement depth, where the first set of teeth 183 overlap with the second set of teeth 185 of opposing face 194 by a second, shorter distance.

A difference between the first target engagement depth and the second target engagement depth may depend on a difference between the first gear ratio and the second gear ratio. Due to the difference between the first gear ratio and the second gear ratio, the second torque applied to transition output shaft 108 by the first output gear 132 and the third torque applied to transition output shaft 108 by the second output gear 134 may not be the same. For example, the second torque may be greater than the third torque. As a result of the second torque being greater than the third torque, a first area of face-sharing contact between the first set of teeth 173 and the second set of teeth 175 of the first gear used to transfer the second torque may be greater than a second area of face-sharing contact between the first set of teeth 183 and the second set of teeth 185 of the second gear used to transfer the third torque. For example, the first area of face-sharing contact may be similar to the area of face-sharing contact 225 of FIG. 2C, and the second area of face-sharing contact may be similar to the area of face-sharing contact 215 of FIG. 2B.

Thus, gears having different gear ratios may be advantageously engaged to different target engagement depths depending on an amount of torque expected to be transferred to the gears. If an amount of torque expected to be transferred from a clutch to a gear (e.g., a maximum amount of torque that may be transferred to a gear) is smaller, a smaller target engagement depth may be used. If the maximum amount of torque that may be transferred to the gear is higher, a greater target engagement depth may be used. When a smaller target engagement depth is used, a distance that the clutch travels to reach the target engagement depth may be shorter. As a result of the shorter distance travelled by the clutch, a time of shifting into the gear may be decreased, increasing a shift performance of the vehicle.

Further, a transmission may be designed such that a maximum target engagement depth (e.g., where face-sharing contact between surfaces of all teeth of a face of a clutch an opposing face of an output gear is maximized, as shown in FIG. 2C) may be established for a gear to which a maximum amount of torque is transferred, and/or a minimum target engagement depth may be established for a gear to which a minimum amount of torque is transferred. For example, the face-sharing contact may be maximized for a gear having a lowest gear ratio of a plurality of gears of the transmission. Smaller target engagement depths may be established for gears having higher gear ratios, to which a lesser amount of torque is transferred. A minimum engagement depth may be established for a gear with a highest gear ratio to which a smallest amount of torque is transferred. By establishing appropriate target engagement depths for different gears, an overall speed of shifting between the different gears may be increased, thereby increasing a shift performance of the vehicle.

Figure 3:
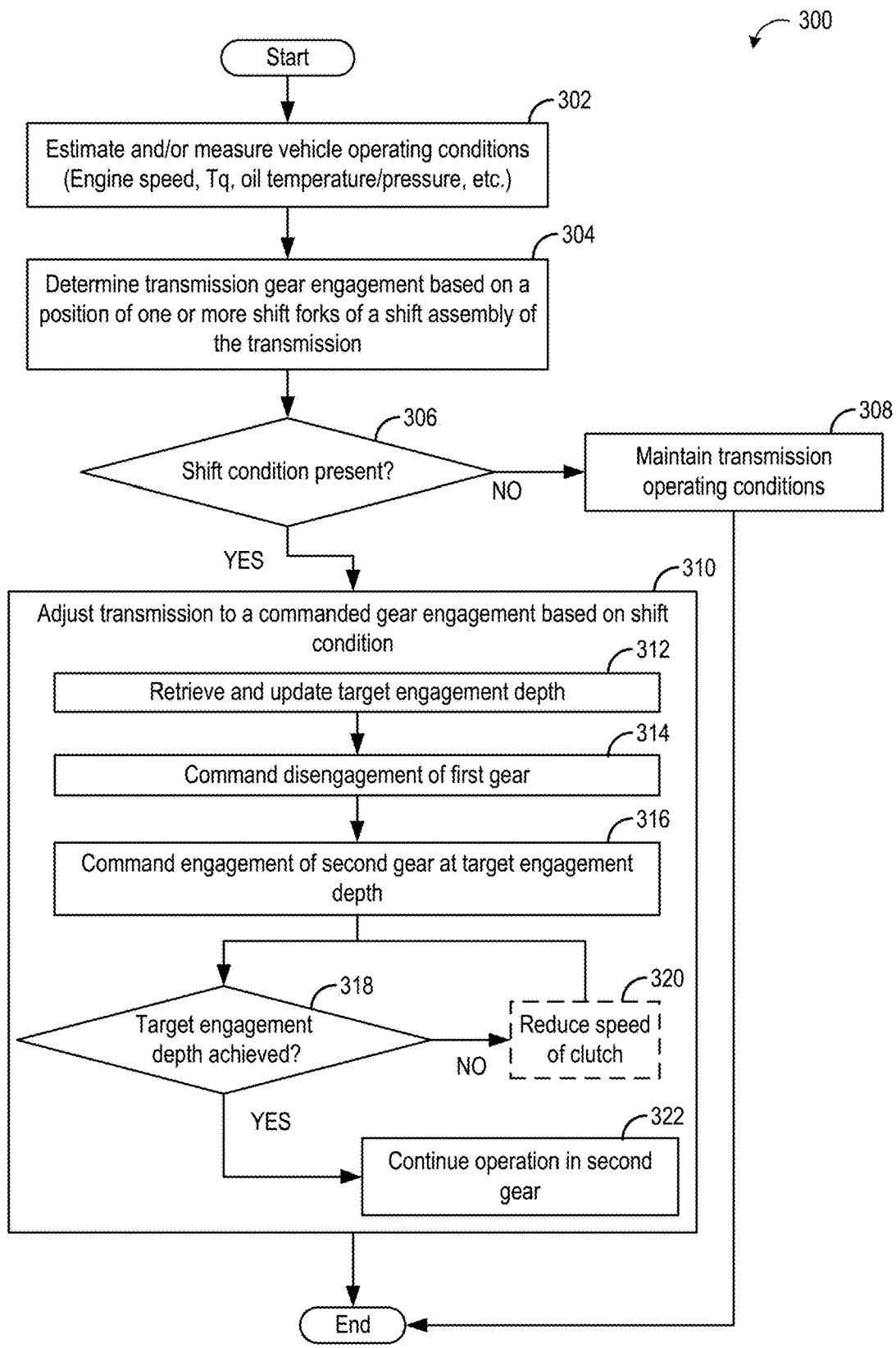
FIG. 3 is a flowchart illustrating an exemplary method for engaging one or more gears with a dog clutch, in accordance with one or more embodiments of the present disclosure.

Referring now to FIG. 3, an exemplary method 300 is shown for engaging one or more gears of a transmission of a vehicle, where a depth of engagement of a clutch of the transmission may be different for each one of the one or more gears of the transmission. In various embodiments, the clutch is a dog clutch such as the dog clutch 130 of FIG. 1B, which may include a dual-faced clutch collar such as the dual-faced clutch collar of FIG. 1B. The systems and components described herein with reference to FIG. 3 may be similar to, or the same as, those discussed above with reference to FIGS. 1A-2C. However, in some examples, method 300 may be implemented by other systems, processors, or components without departing from the scope of this disclosure. Instructions for carrying out method 300 may be executed by a controller such as controller 110 of FIG. 1A, based on instructions stored on a memory of the controller and in conjunction with signals received from sensors of various systems of the vehicle, such as the sensors described in reference to vehicle 100 of FIG. 1A. The controller may employ actuators of the transmission to adjust operation of the transmission, in accordance with method 300.

At 302, method 300 includes estimating and/or measuring vehicle operating conditions. Vehicle operating conditions may be estimated based on one or more outputs of various sensors of the vehicle (e.g., such as oil temperature sensors, engine speed or wheel speed sensors, torque sensors, cam position sensors, etc., as described above in reference to vehicle 100 of FIG. 1A). Vehicle operating conditions may include engine speed and load, vehicle speed, position of one or more shift forks of a shift assembly, transmission oil temperature, exhaust gas flow rate, mass air flow rate, coolant temperature, coolant flow rate, engine oil pressures (e.g., oil gallery pressures), operating modes of one or more intake valves and/or exhaust valves, electric motor speed, battery charge, engine torque output, vehicle wheel torque, etc.

At 304, method 300 includes determining a transmission gear engagement based on a position of the one or more shift forks of the shift assembly (e.g., shift fork 168 of shift assembly 112). In various embodiments, the position of the one or more shift forks may be determined from feedback from a position sensor. As one example, the controller may determine that the one or more shift forks are in a neutral position (e.g., where the position does not result in engagement of a gear of the transmission). As another example, the controller may determine that a first shift fork of the one or more shift forks is in a neutral position, while a second shift fork of the one or more shift forks is in a non-neutral position (e.g., where the non-neutral position indicates an engagement of a gear of the transmission).

At 306, method 300 includes determining whether a shift condition is present. In some embodiments, the transmission may be a manual transmission, and the shift condition may be present when an operator of the vehicle adjusts an input device of the manual transmission (e.g., an input device 114), such as a shift lever. For example, the operator may manually disengage a clutch of the transmission (e.g., dog clutch 130) from a first gear of the transmission (e.g., first output gear 132) and adjust a position of the shift lever to engage the clutch with a second gear of the transmission (e.g., second output gear 134).

Alternatively, the transmission may be an automatic or automatic manual transmission, where the shift condition may be one of a plurality of different conditions, as determined by the controller, resulting in a commanded adjustment to the current gear engagement of the transmission via the shift assembly. For example, the controller may continuously monitor one or more parameters (e.g., vehicle speed, accelerator pedal position, engine speed, electric motor speed, an estimated and/or a predicted shifting speed, fuel efficiency, tow load, road grade, engine temperature, motor temperature, battery consumption, reduction of component wear and/or degradation, etc.) and may determine that a shift condition is present based on the vehicle operating conditions. As one example, the controller may determine whether a shift condition is present based on accelerator pedal position and vehicle speed. For example, the determination of whether a shift condition is present may be performed by the controller via instructions stored in non-transitory memory of the controller, with the determination being a function of both accelerator pedal position and vehicle speed.

The determination of whether the shift condition is present may be based on input received by the controller from one or more sensors of the vehicle. For example, based on input from one or more position sensors, the controller may determine at 304 that the transmission of the vehicle is operating with a first gear (e.g., first output gear 132) of the transmission engaged. Based on a vehicle speed sensor, the controller may determine that the vehicle speed and/or engine speed is above a pre-determined speed at which transitioning from engagement of the first gear to engagement of a second gear (e.g., second output gear 134)

provides increased engine efficiency (e.g., to maintain the engine speed within a pre-determined range, where the pre-determined range includes engine speeds having a relatively high ratio of torque output versus fuel consumption). The controller may also determine from the vehicle speed sensor that the vehicle speed is increasing (e.g., based on engine speed, previous vehicle speeds, change in vehicle elevation, commanded fuel injection rate, etc.). Based on the aforementioned determinations (e.g., that the vehicle is being operated in the first gear, that the vehicle speed is above the threshold value, and that engine speed and/or vehicle speed is increasing), the controller may determine that a shift condition is present, and therefore the transmission of the vehicle may be shifted from operating with the first gear engaged to operating with the second gear engaged. Alternatively, if the controller determines that the vehicle is being operated in the second gear, and the engine speed sensors indicate that the vehicle speed and/or engine speed is decreasing and that the vehicle speed has fallen below a pre-determined speed at which transitioning from the second gear to the first gear provides increased engine efficiency, the controller may determine that a shift condition is present (e.g., that the vehicle may be shifted from the second gear down to the first gear).

The controller may determine whether a shift condition is present based on input from one or more sensors that include engine speed sensors, wheel speed sensors, throttle sensors, pedal position sensors, oil temperature or pressure sensors, and so on. The controller may determine whether the shift condition is present based on one or more algorithms stored in a memory of the controller, where in some examples the algorithms may be updated responsive to changes in vehicle conditions (e.g., degradation of one or more transmission components) and/or operating driving habits via application of one or more of artificial intelligence (AI), machine learning, and/or data analytics. In some examples, the controller may determine whether the shift condition is present based on a pre-determined vehicle operating mode selected by an operator of the vehicle via a user input device (e.g., button, switch, touchscreen, etc.). For example, a first vehicle operating mode may be configured such that the controller determines that the shift condition is present during conditions in which the vehicle speed is outside of a first pre-determined range of vehicle speeds (e.g., 10 MPH to 20 MPH) while operating with the first gear of the transmission engaged. During conditions in which a different, second vehicle operating mode is selected, the controller may determine that the shift condition is present while the vehicle speed is outside of a different, second pre-determined range of engine speeds (e.g., 20 MPH to 30 MPH) while operating with the first gear of the transmission engaged. The first vehicle operating mode may correspond to a fuel economy mode, for example, while the second vehicle operating mode may correspond to a high torque output mode.

If it is determined at 306 that a shift condition is not present, method 300 proceeds to 308, and the transmission operating conditions are maintained. Maintaining the transmission operating conditions may include maintaining the current gear engagement of the transmission and not adjusting the gear engagement. Maintaining the transmission operating conditions may further include continuing to receive data from transmission sensors (e.g., oil temperature sensors, oil pressure sensors, etc.).

If the controller determines at 306 that a shift condition is present, method 300 proceeds to 310. At 310, the controller may adjust the transmission to a commanded gear engagement by adjusting a position of the one or more shift forks based on the shift condition at 306. As described herein, adjusting the transmission to a commanded gear engagement may include transitioning through configurations in which no gears of the transmission are engaged (e.g., neutral configurations). For example, if the vehicle is operating in the first gear when the controller determines that the shift condition is present (e.g., the estimated and/or measured vehicle speed exceeds the threshold vehicle speed as described above), the controller may initiate a transition from operating the transmission with the first gear engaged to operating the transmission with the second gear engaged by adjusting a shift fork of the one or more shift forks to a neutral position (e.g., a position that does not result in engagement of a gear of the transmission) to disengage the first gear, and then adjusting the shift fork from the neutral position to a position in which the second gear is engaged. Although the transition from engagement of the first gear to engagement of the second gear may include briefly operating the transmission in a neutral gear configuration (e.g., a configuration in which no gears of the transmission are engaged, such as while the first gear is disengaged and before the second gear is engaged), the transition may be referred to as shifting from first gear to second gear.

At 312, adjusting the transmission to a commanded gear engagement includes looking up a target depth at which to engage the second gear. In various embodiments, the target depth may be retrieved from a lookup table stored in a memory of the controller. For example, the lookup table may include a gear selection matrix indicating target depths for each of a plurality of gears. The gear selection matrix may include a torque capacity calculation associated with each gear, where a maximum amount of torque expected to be transmitted to the gear is calculated. In various embodiments, the torque capacity calculation may be performed by a manufacturer of the transmission under experimental conditions. An example gear selection matrix is shown below in table 1:

| (1) Gear State Target Engagment Depth Matrix | | |
|---|---|---|
| Target Gear Condition | Max Transmited Torque | Min engagment Depth (mm) |
| 1st | 15100 | 2.56 |
| 2nd | 8392 | 1.42 |
| 3rd | 7053 | 1.19 |
| 4th | 3915 | 0.53 |

At 314, adjusting the transmission to a commanded gear engagement includes commanding a disengagement of the current gear. Disengaging the current gear may include disengaging teeth (e.g., the first set of teeth 173) of a face of a dual-faced clutch collar (e.g., dual-faced clutch collar 171) of a corresponding dog clutch from teeth on an opposing face of the first gear (e.g., the second set of teeth 175). When the teeth of the first face of the dual-faced clutch collar are disengaged, a first output torque supported by the first face of the dual-faced clutch collar may be released, whereby the first gear may no longer be transferring torque from an input shaft (e.g., transmission input shaft 106) of the transmission to an output shaft (e.g., transmission output shaft 108) of the transmission.

At 316, adjusting the transmission to a commanded gear engagement includes commanding an engagement of the dog clutch with the second gear at the target engagement depth retrieved from the lookup table. Engaging the dog clutch with the second gear further comprises engaging teeth of a second face of the dual-faced clutch collar (e.g., the first set of teeth 183) with corresponding teeth on an opposing face of the second gear (e.g., the second set of teeth 185). When the teeth of the second face of the dual-faced clutch collar engage the corresponding teeth of the second gear, a second output torque may be generated on the output shaft through the dual-faced clutch collar. The second output torque may be different from the first output torque released by the first gear, as a result of a different gear ratio of the second gear with respect to the first gear.

As described above, the target engagement depth of the teeth of the first face of the dual-faced clutch collar and the target engagement depth of the teeth of the second face of the dual-faced clutch collar may be different, based on a difference between the first output torque and the second output torque. For example, the target engagement depth of the teeth of the first face of the dual-faced clutch collar may be based on the first output torque, and the target engagement depth of the teeth of the second face of the dual-faced clutch collar may be based on the second output torque. In other words, if the second output torque generated by the second gear is greater than the first output torque generated by the first gear, the target engagement depth of the second face of the dual-faced clutch collar may be greater than the target engagement depth of the first face of the dual-faced clutch collar.

At 318, method 300 includes determining whether the target engagement depth for the second gear has been achieved. In various embodiments, a determination of whether the target engagement depth has been achieved may depend on an output of a clutch engagement sensor (e.g., clutch engagement sensor 199 of FIG. 1B). If at 318 it is determined that the target engagement depth has not been achieved, method 300 proceeds to 320.

At 320, method 300 may include reducing a speed of the clutch. In other words, as the clutch engages the second gear, the speed of the clutch may be controlled to accurately achieve the target engagement depth. For example, when the clutch leaves a neutral position to travel towards the second gear, the clutch may travel at a first speed. As the clutch approaches the second gear, the speed of the clutch may be decreased to a second, lower speed by the controller. As the clutch engages the second gear and approaches the target engagement depth, the speed of the clutch may be decreased to a third, even lower speed by the controller. By decreasing the speed of the clutch, a greater degree of precision may be achieved in engaging the second gear at the target engagement depth. In some embodiments, the speed of the clutch may be controlled based on the output of the clutch engagement sensor. For example, if the output of the clutch engagement sensor indicates that the clutch has passed a first threshold depth, the speed of the clutch may be reduced by a first amount; if the output of the clutch engagement sensor indicates that the clutch has passed a second threshold depth, the speed of the clutch may be reduced by a second amount; and so on.

If at 320 it is determined that the target engagement depth has been achieved, method 300 proceeds to 322. At 322, method 300 includes continuing operation of the vehicle in the second gear.

As an example, the vehicle may be operating in the first gear. In the first gear, the clutch may be engaging the first gear at a first target engagement depth set by the controller. In response to an operator input, such as via an accelerator pedal, the speed of the vehicle may increase. When the speed increases, a shift condition may be met, whereby the controller may initiate a shifting of gears from the first gear to the second gear. Prior to shifting from the first gear to the second gear, the controller may consult the gear selection matrix stored in a lookup table in the memory of the controller to determine a second target engagement depth for engaging the second gear. The controller may retrieve the second target engagement depth from the lookup table, and update the target engagement depth for the clutch at the retrieved, second target engagement depth. The controller may then command the disengagement of the first gear, and command the engagement of the second gear at the updated, second target engagement depth. As the clutch approaches the second gear prior to engaging the second gear, the clutch may move at a first, fast speed. As the clutch begins to engage the second gear, the speed of the clutch may be reduced by the controller to a second, slower speed. As the clutch begins to approach the target engagement depth, the speed of the clutch may be reduced to a third, even slower speed. In this way, the speed of the clutch may be decreased as the second gear is engaged to precisely engage the second gear at the target engagement depth. In some embodiments, the speed of the clutch may be decreased in accordance with a speed function, such as a non-linear function. In some embodiments, the speed of the clutch may be decreased based on an output of the clutch engagement sensor, for example, as a function of a distance between the teeth of the clutch and opposing teeth of the second gear.

Figure 4:
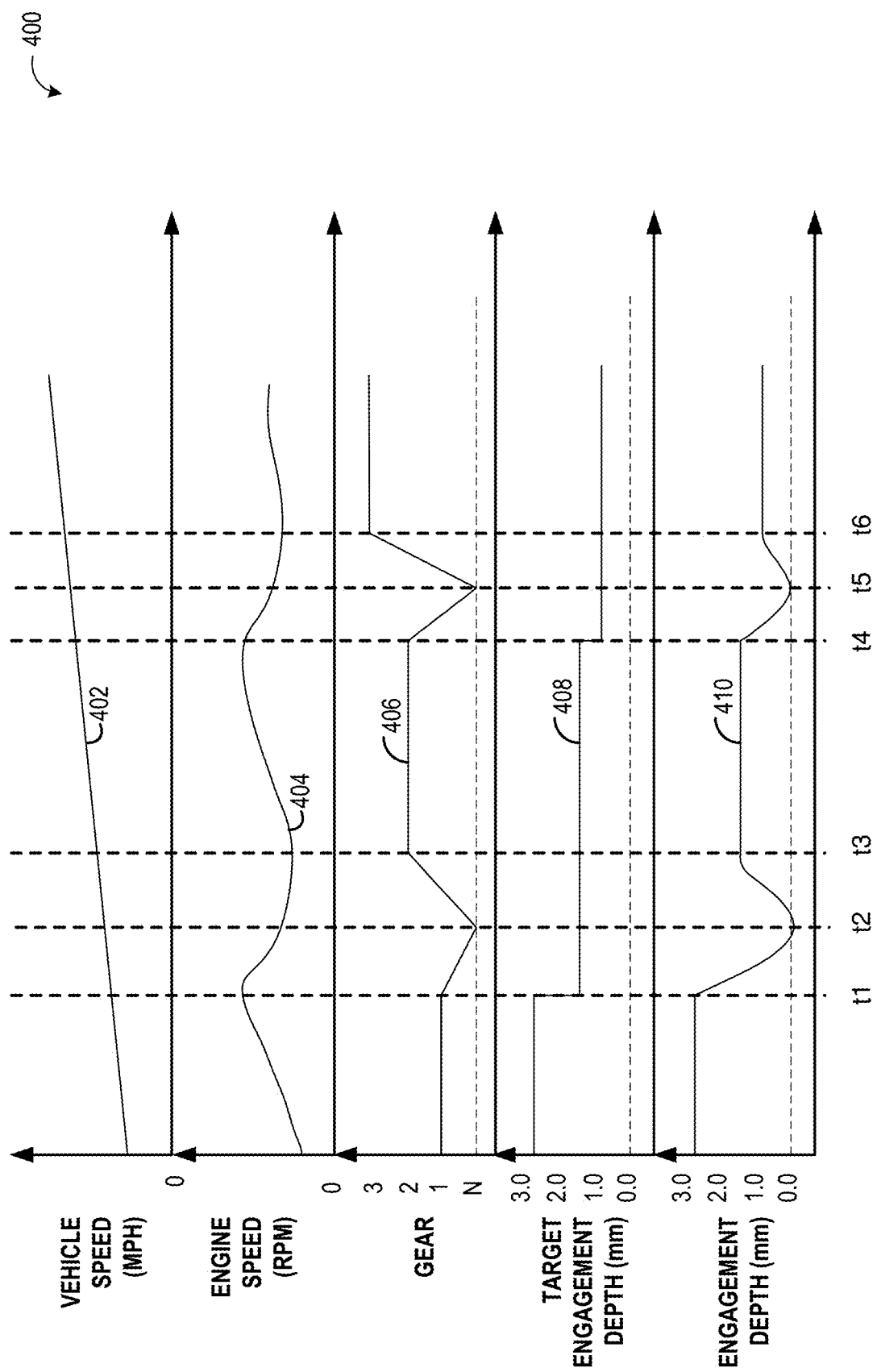
FIG. 4 is a timing diagram illustrating various events occurring during shifting of one or more gears with a dog clutch, in accordance with one or more embodiments of the present disclosure.

FIG. 4 shows an example timing diagram 400, showing an exemplary sequence of events of a transmission system of a vehicle during a shifting of gears of the transmission system. As described above in reference to FIGS. 1B-3, a shift performance of the vehicle may be increased by engaging gears of different gear ratios at different engagement depths. For example, a first gear of the transmission system with a first gear ratio may transfer a first maximum amount of torque to wheels of the vehicle, and a second gear of the transmission system with a second gear ratio may transfer a second maximum amount of torque to the wheels. The first gear ratio may be different from the second gear ratio, where the first maximum amount of torque may be different from the second maximum amount of torque. When the first gear is engaged, teeth of a clutch of the transmission may engage teeth of the first gear at a first engagement depth. When the second gear is engaged, teeth of a clutch of the transmission may engage teeth of the second gear at a second engagement depth. If the second maximum amount of torque is less than the first maximum amount of torque, the second engagement depth may be less than the first engagement depth. By decreasing the second engagement depth, a distance traveled by the clutch may be shortened, increasing a shifting speed and an overall shift performance of the vehicle.

A horizontal (x-axis) of timing diagram 400 denotes time and the vertical markers t1-t6 identify significant times during a transition between the gears of the transmission system. Timing diagram 400 includes five plots. A first plot, line 402, shows a speed of the vehicle in miles per hour (MPH). A second plot, line 404, shows an engine speed measured in rotations per minute (RPM). A third plot, line 406, shows a selected gear of the transmission system. A fourth plot, line 408, shows a target engagement depth of the clutch, measured in millimeters (mm). The target engagement depth may be a desired engagement depth for a selected gear, which may be stored in a memory of a controller of the transmission system. A fifth plot, line 410, shows an engagement depth of the clutch, measured in millimeters (mm).

Prior to time t1, the vehicle is in a first gear of the transmission system, and the speed of the engine is increasing. For example, the speed of the engine may be increasing in response to an operator request via an accelerator of the vehicle. As the engine speed increases, the speed of the vehicle increases. The first gear is engaged at a first target engagement depth. For example, the first target engagement depth may be 2.56 mm.

At time t1, the engine speed reaches a threshold speed for shifting gears. In response to the engine speed reaching the threshold speed for shifting gears, a shift from the first gear to a second gear of the transmission system is commanded by the controller. When the shift from the first gear to the second gear is commanded, the controller retrieves a new target engagement depth for the second gear from the memory. In various embodiments, the new target engagement depth is retrieved from a lookup table based on the selected gear. For example, the target engagement depth for the second gear may be 1.42 mm. The controller updates the target engagement depth to the new target engagement depth for the second gear, as indicated by line 408.

Between time t1 and time t2, the clutch disengages from the first gear. As the clutch disengages, the engagement depth of the clutch decreases to zero, and the engine speed decreases as the clutch approaches a neutral position. At time t2, the clutch achieves the neutral position, where no gears of the transmission system are engaged. The engagement depth is zero.

Between time t2 and time t3, the clutch engages the second gear. In various embodiments, when engaging with the second gear, a speed of travel of the clutch may vary, as indicated by a nonlinear behavior of line 410 between time t2 and time t3. Specifically, as the clutch moves from the neutral position towards the second gear, the clutch may move at a first speed. As the clutch approaches the target engagement depth, the speed of the clutch may decrease. By decreasing the speed of the clutch at the clutch engages the second gear, the target engagement depth may more accurately be achieved. In various embodiments, the controller may stop movement of the clutch at the target engagement depth based on an output of a clutch engagement sensor.

At time t3, the clutch has engaged the second gear at the target engagement depth for the second gear (e.g., 1.42 mm). Because the engagement depth of the clutch for the second gear is less than the engagement depth for the first gear, a distance the clutch travels to engage the second gear is less than a distance traveled to engage the first gear. As a result of the clutch travelling a shorter distance, engaging the second gear at the target engagement depth, rather than fully engaging the second gear (e.g., at a maximum depth), may reduce a time taken to shift from the first gear to the second gear, increasing the shift performance of the transmission system.

Between time t3 and t4, the clutch is engaged with the second gear at the target engagement depth, and the engine speed increases to meet a continued request for speed by the operator.

At time t4, the engine speed reaches the threshold speed for shifting gears. In response to the engine speed reaching the threshold speed, a shift from the second gear to a third gear of the transmission system is commanded by the controller. When the shift from the second gear to the third gear is commanded, the controller retrieves a new target engagement depth for the third gear from the memory. For example, the target engagement depth for the third gear may be 1.19 mm. The controller updates the target engagement depth to the new target engagement depth for the second gear, as indicated by line 408.

Between time t4 and time t5, the clutch disengages from the second gear. As the clutch disengages, the engagement depth of the clutch decreases to zero, and the engine speed decreases as the clutch approaches a neutral position. Because the engagement depth of the clutch for the second gear at time t4 is less than the engagement depth of the clutch for the first gear at time t1, a time taken to disengage the clutch from the second gear (t4-t5) is less than a time taken to disengage the clutch from the first gear (t1-t2).

At time t5, the clutch achieves the neutral position, where no gears of the transmission system are engaged. The engagement depth is zero.

Between time t5 and time t6, the clutch engages the third gear. As described above, when engaging with the third gear, the speed of travel of the clutch may vary. As the clutch moves from the neutral position towards the third gear, the clutch may move at a first speed. As the clutch approaches the target engagement depth for the third gear, the speed of the clutch may decrease. By decreasing the speed of the clutch as the clutch engages the third gear, the target engagement depth may more accurately be achieved.

Because the engagement depth of the clutch for the third gear at time t6 is less than the engagement depth of the clutch for the second gear at time t3, a distance traveled by the clutch and a time taken to engage the third gear (t5-t6) is less than a distance traveled by the clutch and a time taken to engage the first gear (t2-t3). Because of the decrease in the time and distance, the shift performance of the transmission system is increased, resulting in a smoother driving experience for the operator with faster gear shifts.

At time t6, the clutch has engaged the third gear at the target engagement depth for the third gear (e.g., 1.19 mm). After time t6, the vehicle continues to operate in the third gear, and the engine speed begins to increase.

Thus, as described herein, when engaging an output gear of a transmission, a depth of engagement of a clutch may be selected for the output gear that specifies an amount of face-sharing contact between teeth on a face of the clutch and teeth on an opposing face of the output gear. The depth of engagement may correspond to a distance that the clutch travels when engaging the output gear. As the clutch travels toward the output gear, and the teeth on the face of the clutch mesh with the teeth on the opposing face of the output gear, the amount of face-sharing contact between the teeth on a face of the clutch and the teeth on an opposing face of the output gear may increase. As the amount of face-sharing contact increases, a greater amount of torque may be transferred from the clutch to the output gear. When an amount of torque transferred to the output gear is highest (e.g., based on a gear ratio of the output gear), the clutch may engage the output gear at a first target engagement depth. When the amount of torque transferred to the output gear is lower, the clutch may engage the output gear at a second target engagement depth, where the second target engagement depth is less than the first target engagement depth. For other gears where the amount of torque transferred to the output gear is lower, the clutch may engage the other gears at smaller target engagement depths, where the smaller target engagement depths are sufficient to support the lower amount of torque, but may not be sufficient to support a higher amount of torque. The target engagement depths may be determined by a manufacturer and stored in a lookup table, and a controller of the transmission may retrieve a target engagement depth for a gear at a time when the gear is selected. By controlling the depth of engagement of the clutch based on a maximum amount of torque expected by the gear, an overall distance that the clutch travels when switching between gears may be minimized. By minimizing the overall distance, a performance of the transmission may be increased during shifting, where gears may be engaged more rapidly and smoothly.

The technical effect of adjusting a target engagement depth of a clutch when shifting gears of a transmission, is that a distance travelled by the clutch may be reduced, increasing an efficiency and a performance of the transmission.

The disclosure also provides support for a method to decrease a shifting time for a transmission with actuated clutches, the method comprising: controlling an engagement depth of a clutch based on a gear of the transmission that is being selected by the clutch. In a first example of the method, the clutch is a dog clutch. In a second example of the method, optionally including the first example, the transmission includes a plurality of gears, each gear of the plurality of gears having a different gear ratio. In a third example of the method, optionally including one or both of the first and second examples, controlling the engagement depth of the clutch based on a gear that is being selected further comprises: operating with a first gear of the transmission engaged, retrieving a target engagement depth of a second gear of the transmission from a memory of a controller of the transmission, commanding the clutch to disengage from the first gear, and commanding the clutch to engage the second gear at the target engagement depth. In a fourth example of the method, optionally including one or more or each of the first through third examples, the method further comprises: retrieving the target engagement depth from a gear selection matrix in a lookup table stored in the memory of the controller, the target engagement depth based on a maximum transmitted torque of the second gear. In a fifth example of the method, optionally including one or more or each of the first through fourth examples, a speed of the clutch is decreased as the clutch engages the gear as a function of a distance between a first set of teeth of a first face of the clutch and a second set of teeth of a second, opposing face of the gear, the distance based on an output of a clutch engagement sensor. In a sixth example of the method, optionally including one or more or each of the first through fifth examples, an area of face-sharing contact between a first set of teeth of a first face of the clutch and a second set of teeth of a second, opposing face of the gear increases as the engagement depth increases. In a seventh example of the method, optionally including one or more or each of the first through sixth examples, the gear has a lowest gear ratio of a plurality of gears of the transmission, and the area of face-sharing contact between the first set of teeth and the second set of teeth is maximized for the gear. In a eighth example of the method, optionally including one or more or each of the first through seventh examples, the gear has a highest gear ratio of a plurality of gears of the transmission, and the area of face-sharing contact between the first set of teeth and the second set of teeth is minimized for the gear.

The disclosure also provides support for a transmission system, comprising: a controller including one or more processors, and a memory storing instructions executable by the one or more processors to: in response to a shift condition being met to shift from a first gear of the transmission system to a second gear of the transmission system, the first gear engaged at a first target engagement depth: select a second target engagement depth of the second gear, actuate a clutch of the transmission system to disengage from the first gear of the transmission system, and actuate the clutch to engage the second gear of the transmission system with the second target engagement depth. In a first example of the system, the second target engagement depth is different from the first target engagement depth. In a second example of the system, optionally including the first example: the first target engagement depth for the first gear maximizes a face-sharing contact between surfaces of all teeth of the clutch and all teeth of the first gear, and the second target engagement depth for the second gear reduces the face-sharing contact between surfaces of all teeth of the clutch and all teeth of the first gear. In a third example of the system, optionally including one or both of the first and second examples, the first and second target engagement depths of each gear in the transmission system are calculated based on a maximum amount of torque expected to be transferred to the gear. In a fourth example of the system, optionally including one or more or each of the first through third examples, the clutch is a dog clutch. In a fifth example of the system, optionally including one or more or each of the first through fourth examples, the clutch includes a dual-faced clutch collar configured to engage the first gear via a first set of teeth on a first face of the dual-faced clutch collar, and engage the second gear via a second set of teeth on a second face of the dual-faced clutch collar. In a sixth example of the system, optionally including one or more or each of the first through fifth examples, the first set of teeth includes teeth with a first set of dimensions including a first spacing, and the second set of teeth includes teeth with a second set of dimensions including a second spacing, the second set of dimensions different from the first set of dimensions. In a seventh example of the system, optionally including one or more or each of the first through sixth examples, the first set of teeth includes teeth with a first spacing, and the second set of teeth includes teeth with a second spacing, the second spacing different from the first spacing. In an eighth example of the system, optionally including one or more or each of the first through seventh examples, selecting the second target engagement depth of the second gear further comprises retrieving the second target engagement depth from a gear selection matrix stored in a lookup table in the memory.

The disclosure also provides support for a method, comprising: in response to a first shift condition, actuating a clutch of a transmission to engage a first output gear at a first target engagement depth, and in response to a second shift condition, actuating the clutch to engage a second output gear at a second target engagement depth, the second target engagement depth different from the first target engagement depth. In a first example of the method: the first output gear has a first gear ratio, the second output gear has a second gear ratio, the second gear ratio greater than the first gear ratio, and the second target engagement depth is less than the first target engagement depth.

It will be appreciated that the configurations and routines disclosed herein are exemplary in nature, and that these specific embodiments are not to be considered in a limiting sense, because numerous variations are possible. As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

FIGS. 1B, 2A, 2B, and 2C show example configurations with relative positioning of various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method to decrease a shifting time for a transmission with actuated clutches, the method comprising:
controlling an engagement depth of a clutch based on a gear of the transmission that is being engaged by the clutch, wherein controlling the engagement depth of the clutch based on a gear that is being engaged further comprises:
operating with a first gear of the transmission engaged;
retrieving a target engagement depth of a second gear of the transmission from a memory of a controller of the transmission;
commanding the clutch to disengage from the first gear; and
commanding the clutch to engage the second gear at the target engagement depth.

2. The method of claim 1, wherein the clutch is a dog clutch.

3. The method of claim 1, wherein the transmission includes a plurality of gears, each gear of the plurality of gears having a different gear ratio.

4. The method of claim 1, further comprising retrieving the target engagement depth from a gear selection matrix in a lookup table stored in the memory of the controller, the target engagement depth based on a maximum transmitted torque of the second gear.

5. The method of claim 1, further comprising decreasing a speed of the clutch as a function of a distance between the clutch and the gear, and where the distance is based on an output of a clutch engagement sensor.

6. The method of claim 1, wherein an area of face-sharing contact between a first set of teeth of a first face of the clutch and a second set of teeth of a second, opposing face of the gear increases as the engagement depth increases.

7. The method of claim 6, wherein the gear has a lowest gear ratio of a plurality of gears of the transmission, and the area of face-sharing contact between the first set of teeth and the second set of teeth is maximized for the gear.

8. The method of claim 6, wherein the gear has a highest gear ratio of a plurality of gears of the transmission, and the area of face-sharing contact between the first set of teeth and the second set of teeth is minimized for the gear.

9. A transmission system, comprising:
a controller including one or more processors, and a memory storing instructions executable by the one or more processors to:
in response to a shift condition being met to shift from a first gear of the transmission system to a second gear of the transmission system, the first gear engaged at a first target engagement depth:
select a second target engagement depth of the second gear;
actuate a clutch of the transmission system to disengage from the first gear of the transmission system; and
actuate the clutch to engage the second gear of the transmission system with the second target engagement depth, wherein the first and second target engagement depths of each gear in the transmission system are calculated based on a maximum amount of torque expected to be transferred to the gear.

10. The transmission system of claim 9, wherein the second target engagement depth is different from the first target engagement depth.

11. The transmission system of claim 10, wherein:
the first target engagement depth for the first gear maximizes a face-sharing contact between surfaces of all teeth of the clutch and all teeth of the first gear; and
the second target engagement depth for the second gear reduces the face-sharing contact between surfaces of all teeth of the clutch and all teeth of the first gear.

12. The transmission system of claim 9, Wherein the clutch is a dog clutch.

13. The transmission system of claim 9, Wherein the clutch includes a dual-faced clutch collar configured to engage the first gear via a first set of teeth on a first face of the dual-faced clutch collar, and engage the second gear via a second set of teeth on a second face of the dual-faced clutch collar.

14. The transmission system of claim 13, Wherein the first set of teeth includes teeth With a first set of dimensions including a first spacing, and the second set of teeth includes teeth With a second set of dimensions including a second spacing, the second set of dimensions different from the first set of dimensions.

15. The transmission system of claim 13, Wherein the first set of teeth includes teeth with a first spacing, and the second set of teeth includes teeth with a second spacing, the second spacing different from the first spacing.

16. The transmission system of claim 9, Wherein selecting the second target engagement depth of the second gear further comprises retrieving the second target engagement depth from a gear selection matrix stored in a lookup table in the memory.

17. A method, comprising:
in response to a first shift condition, actuating a clutch of a transmission to engage a first output gear at a first target engagement depth; and
in response to a second shift condition, actuating the clutch to engage a second output gear at a second target engagement depth, the second target engagement depth different from the first target engagement depth, wherein the first target engagement depth of the first output gear is based on a maximum amount of torque expected to be transferred to the first output gear, and wherein the second target engagement depth of the second output gear is based on a maximum amount of torque expected to be transferred to the second output gear.

18. The method of claim 17, wherein:
the first output gear has a first gear ratio;
the second output gear has a second gear ratio, the second gear ratio greater than the first gear ratio; and
the second target engagement depth is less than the first target engagement depth.

* * * * *